(12) United States Patent
Hac et al.

(10) Patent No.: US 6,453,226 B1
(45) Date of Patent: Sep. 17, 2002

(54) INTEGRATED CONTROL OF ACTIVE TIRE STEER AND BRAKES

(75) Inventors: Aleksander B. Hac, Dayton, OH (US); Hsien H. Chen, Troy, MI (US); Edward J. Bedner, Brighton, MI (US); Steven P. Loudon, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/769,676

(22) Filed: Jan. 25, 2001

(51) Int. Cl.$^7$ .............................. B60T 8/60; B60T 8/58
(52) U.S. Cl. .......................... 701/48; 701/41; 701/58; 701/70; 280/703; 280/772; 280/5.51; 180/41
(58) Field of Search ............................ 701/48, 41, 58, 701/70, 37, 91; 280/772, 703, 707, 211, 5.51; 180/41

(56) References Cited

U.S. PATENT DOCUMENTS 4,761,022 A  *  8/1988  Ohashi et al. .............. 280/772

OTHER PUBLICATIONS

"Closed Loop Yaw Control of Vehicles Using Magneto–Rheological Dampers", Mark O. Bodie and Aleksander Hac; Society of Automotive Engineers, Inc.; 1999.*
"Nonlinear Control of Vehicle Yaw Rate via Roll Moment Distribution" proceedings of the American Control Conference; Jefferson, Maryland; Jun., 1994.*
"Active Control Strategy for Stability"; Masaki Yamamoto; SAE technical Paper Series No. 911902; Sep. 1991.*

* cited by examiner

Primary Examiner—William A. Cuchlinski, Jr.
Assistant Examiner—Tuan C To
(74) Attorney, Agent, or Firm—Scott A. McBain

(57) ABSTRACT

An integrated active steering and braking control system for providing one or more corrective yaw moments to a vehicle in response to a plurality of signals indicative of operational and environmental conditions related to the vehicle is disclosed. The system comprises a reference model, an estimator, a vehicle level brake/steer controller, and an actuator controller. The reference model provides a feedforward front steering angle correction signal a feedforward rear steering angle correction signal, a desired yaw rate signal, a desired lateral velocity signal, and a desired side slip angle signal. The estimator provides an estimated surface coefficient of adhesion signal, an estimated lateral velocity signal, and an estimated side slip angle signal. In response to the signals from the reference model and the estimator, the vehicle level brake/steer controller provides either a desired speed differential signal, a desired front steering angle signal and/or a desired rear steering angle signal. The actuator controller selectively provides a corrective braking signal to a brake actuator, a corrective front steering signal to a steering actuator, and a corrective rear steering signal to the steering actuator as a function of the desired speed differential signal, the desired front steering angle signal, and the desired rear steering angle signal, respectively.

20 Claims, 9 Drawing Sheets

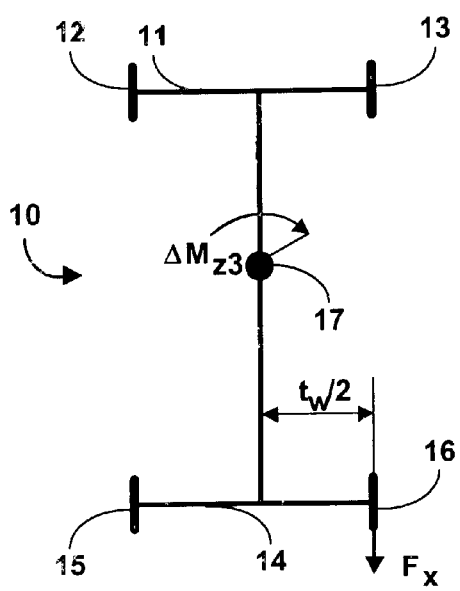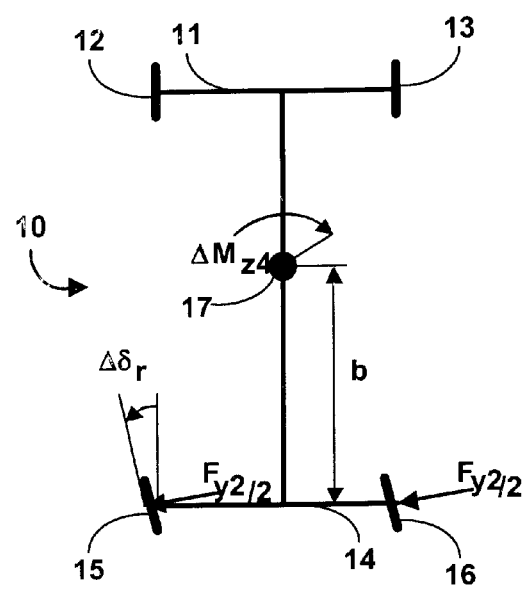
FIG. 1C
FIG. 1D

INTEGRATED CONTROL OF ACTIVE TIRE STEER AND BRAKES

FIELD OF THE INVENTION

The present invention generally relates to control systems for automotive vehicles, and more particularly relates to an integrated control of an active steering system and a brake system of an automotive vehicle for improving upon a handling, stability, and a maneuverability of the automotive vehicle.

BACKGROUND OF THE INVENTION

Some automotive vehicles known in the art utilize an active brake control to enhance a directional stability of the vehicle at or close to a limit of adhesion. Some other automotive vehicles known in the art utilize a limited active control of a rear tire steering angle in order to improve a vehicle handling and maneuverability at low speeds. More recently, automotive vehicles are utilizing a limited active control of a front tire steering angle to introduce a steering correction to a steering angle commanded by a vehicle driver in an effort to improve a vehicle directional stability. The present invention addresses a need for an integrated control of vehicle brakes, and a front tire steering angle and/or a rear tire steering angle.

SUMMARY OF THE INVENTION

One form of the present invention is an integrated active steering and braking control method for a vehicle. First, a first corrective yaw moment for the vehicle as a function of a steering angle of an axle of the vehicle is determined, and a second corrective yaw moment for the vehicle as a function of a speed differential between a first tire and a second tire of the vehicle is determined. Second, a corrective steering signal is provided to a steering system of the vehicle whereby the first corrective yaw moment is applied to the vehicle, and a corrective braking signal is provided to a braking system of the vehicle whereby the second corrective yaw moment is applied to the vehicle.

A second form of the present invention is also an integrated active steering and braking control method for a vehicle. First, a desired speed differential between the speed of the first tire and the speed of the second tire is determined. Second, a desired steering angle of the axle as a function of said desired speed differential is determined.

A third form of the present invention is also an integrated active steering and braking control method for a vehicle. First, a feedforward portion of a corrective front steering angle signal in response to a plurality of operational signals indicative of an operational state of the vehicle is determined. Second, a feedforward portion of a corrective rear steering angle signal in response to said plurality of operational signals.

A fourth form of the present invention is also an integrated active steering and braking control system for a vehicle comprising a first controller and a second controller. The first controller is operable to determine a first corrective yaw moment for the vehicle as a function of a steering angle of an axle of the vehicle, and to determine a second corrective yaw moment for the vehicle as a function of a speed differential between a first tire and a second tire of the vehicle. The second controller is operable to provide a corrective steering signal to a steering system of the vehicle whereby the first corrective yaw moment is applied to the vehicle, and to provide a corrective braking signal to a braking system of the vehicle whereby the second corrective yaw moment is applied to the vehicle.

A fifth form of the present invention is also an integrated active steering and braking control system for a vehicle. The system comprises a means for determining a feedforward portion of a corrective front steering angle signal in response to a plurality of operational signals indicative of an operational state of the vehicle. The system further comprises a means for determining a feedforward portion of a corrective rear steering angle signal in response to said plurality of operational signals.

A sixth form of the present invention is a vehicle comprising an axle, a first tire, a second tire, and an integrated active steering and braking control system. The system is operable to determine a desired speed differential between a speed of the first tire and a speed of the second tire and to determine a desired steering angle of the axle as a function of the desired speed differential.

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 1C is a vector diagram illustrating a yaw moment of a vehicle that is generated by a differential braking of a pair of rear tires of the vehicle as known in the art;

FIG. 1D is a vector diagram illustrating a yaw moment of a vehicle that is generated by a rear tire steering of the vehicle as known in the art;

DETAILED DESCRIPTION OF THE PRESENTLY PREFERRED EMBODIMENTS

Figure 1A:
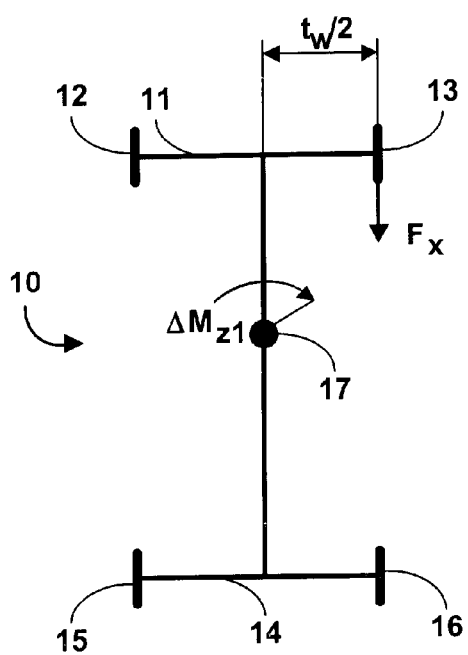
FIG. 1A is a vector diagram illustrating a yaw moment of a vehicle that is generated by a differential braking of a pair of front tires of the vehicle as known in the art.

Referring to FIGS. 1A–1D, a vehicle 10 including a front axle 11 having a front left tire 12 and a front right tire 13 coupled thereto, and a rear axle 14 having a rear left tire 15 and a rear right tire 16 coupled thereto is shown. As known by those having ordinary skill in the art, a response of vehicle 10 in a yaw plane is primarily dictated by a combination of longitudinal tire forces and lateral tire forces being applied to tires 11, 12, 15, and 16. Good handling of vehicle 10 in the yaw plane requires that a yaw rate (i.e., a rate of rotation of vehicle 10 about a vertical axis 17 passing through the center of gravity of vehicle 10) and a lateral acceleration of vehicle 10 be consistent with driver intentions, subject to a physical limit imposed by a surface coefficient of adhesion Since the vehicle yaw rate is determined by a yaw moment acting on vehicle 10 (i.e., a moment of forces about vertical axis 17), a main mechanism to control vehicle yaw response is by generating a corrective yaw moment. This can be achieved by applying one or more brakes (not shown) to tires 12, 13, 15, and/or 16; by a change in a steering angle of front axle 11; and/or by a change in a steering angle of rear axle 14.

For example, when vehicle 10 is being driven straight as illustrated in FIG. 1A, a brake force $F_x$ can be applied to front right tire 13 to generate corrective yaw moment $\Delta M_{z1}$ in a clockwise direction about vertical axis 17. Corrective yaw moment $\Delta M_{z1}$ can be computed by the following equation (1):

$$\Delta M_{z1} = F_x * (t_w/2) \tag{1}$$

where $t_w$ is a track width. In a linear range of tire operation, brake force $F_x$ can be approximated by the following equation (2):

$$F_x = C_x * \lambda = C_x * (\Delta v_{lr1}/V) \tag{2}$$

where $C_x$ is a tire longitudinal stiffness; $\lambda$ is a brake slip; $\Delta v_{lr1}$ is a difference in a linear speed of tire 12 and a linear speed of tire 13; and v is a vehicle speed of vehicle 10. Combining equations (1) and (2) yields the following equation (3):

$$\Delta M_{z1} = C_x * (t_w/2) * \Delta v_{lr1}/V \tag{3}$$

Figure 1B:
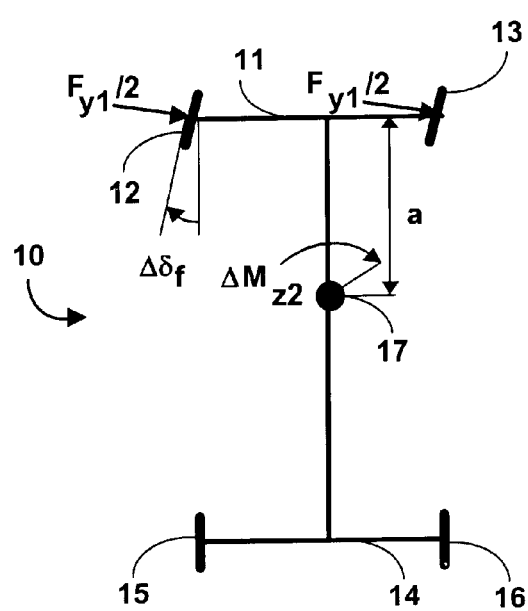
FIG. 1B is a vector diagram illustrating a yaw moment of a vehicle that is generated by a front tire steering of the vehicle as known in the art.

As illustrated in FIG. 1B, tire 12 and tire 13 can also be controlled to generate corrective yaw moment $\Delta M_{z2}$ as a function of incremental front steering angle $\Delta \delta_f$. Corrective yaw moment $\Delta M_{z2}$ can be computed by the following equation (4):

$$\Delta M_{z2} = F_{y1} * a \tag{4}$$

where a is the distance from axis 17 to front axle 11; and $F_{y1}$ is the total lateral force on both tire 12 and tire 13, which in the linear range of tire operation can be computed by the following equation (5):

$$F_{y1} = 2 * C_y * \Delta \delta_f \tag{5}$$

where $C_y$ is a cornering stiffness coefficient of both tire 12 and tire 13. Thus, corrective yaw moment $\Delta M_{z2}$ can also be computed by the following equation (6):

$$\Delta M_{z2} = 2 * C_y * a * \Delta \delta_f \tag{6}$$

Equating yaw moment $\Delta M_{z2}$ to yaw moment $\Delta M_{z1}$ can be accomplished by computing front steering angle $\Delta \delta_f$ under the following equation (7) with the assumption that tire longitudinal stiffness coefficient $C_x$ and tire lateral stiffness $C_y$ are approximately equal:

$$\Delta \delta_f = (C_x * t_w/(4 * C_y * a)) * (\Delta v_{lr1}/v) \approx [t_w/(4*a)] * (\Delta v_{lr1}/v) \tag{7}$$

Also by example, when vehicle 10 is being driven straight as illustrated in FIG. 1C, brake force $F_x$ can be applied to rear right tire 16 to generate corrective yaw moment $\Delta M_{z3}$ in a clockwise direction about vertical axis 17. Corrective yaw moment $\Delta M_{z3}$ can be computed by equation (1). In a linear range of tire operation, brake force $F_x$ can be approximated by the following equation (8):

$$F_x = C_x * \lambda = C_x * (\Delta v_{lr2}/v) \tag{8}$$

where $C_x$ is a tire longitudinal stiffness; $\lambda$ is a brake slip; $\Delta v_{lr2}$ is a difference in a linear speed of tire 15 and a linear speed of tire 16; and v is a vehicle speed of vehicle 10. Combining equations (1) and (8) yields the following equation (9):

$$\Delta M_{z3} = C_x * (t_w/2) * \Delta v_{lr2}/v \tag{9}$$

As illustrated in FIG. 1D, tire 15 and tire 16 can also be controlled to generate corrective yaw moment $\Delta M_{z4}$ as a function of incremental rear steering angle $\Delta \delta_r$. Corrective yaw moment $\Delta M_{z4}$ can be computed by the following equation (10):

$$\Delta M_{z4} = F_{y2} * b \tag{10}$$

where b is the distance from axis 17 to rear axle 14; and $F_{y2}$ is the total lateral force on both tire 15 and tire 16, which in the linear range of tire operation can be computed by the following equation (11):

$$F_{y2} = -2 * C_y * \Delta \delta_r \tag{11}$$

where $C_{y1}$ is a cornering stiffness coefficient of both tire 15 and tire 16. Thus, corrective yaw moment $\Delta M_{z4}$ can also be computed by the following equation (12):

$$\Delta M_{z4} = -2 * C_y * a * \Delta \delta_r \tag{12}$$

Equating yaw moment $\Delta M_{z4}$ to yaw moment $\Delta M_{z3}$ can be accomplished by computing rear steering angle $\Delta \delta_r$ under the following equation (13) with the assumption that tire longitudinal stiffness coefficient $C_x$ and tire lateral stiffness $C_y$ are approximately equal:

$$\Delta \delta_r = -[C_x * t_w/(4 * C_y * b)] * (\Delta v_{lr2}/v) \approx -[t_w/(4*b)] * (\Delta v_{lr2}/v) \tag{13}$$

The present invention is an integrated active steering and braking control method based on equations (7) and (13) that selectively utilizes tire speed differential signal $\Delta v_{lr1}$ to generate corrective yaw moment $\Delta M_{z1}$ and/or to generate corrective yaw moment $\Delta M_{z2}$ when vehicle 10 has an active front steering system, and selectively utilizes tire speed differential signal $\Delta v_{lr2}$ to generate corrective yaw moment $\Delta M_{z3}$ and/or corrective moment $\Delta M_{z4}$ when vehicle 10 has an active rear steering system.

Figure 2:
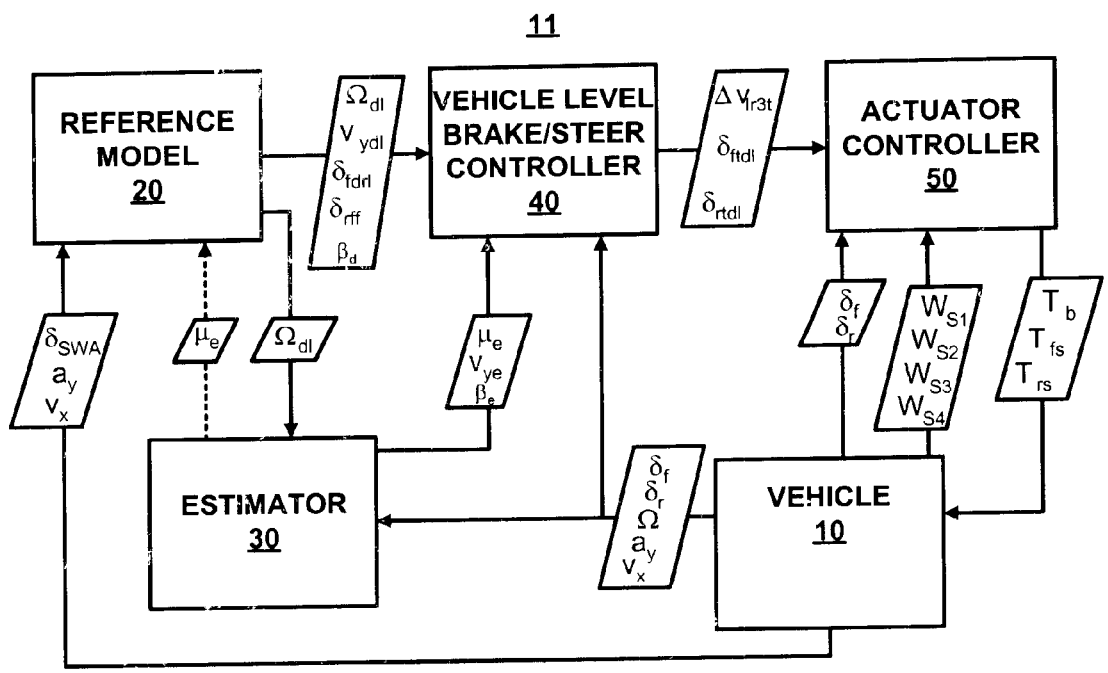
FIG. 2 is a block diagram of one embodiment of a coordinated control system in accordance with the present invention.

Referring to FIG. 2, an integrated active steering and braking control system 11 for vehicle 10 in accordance with the present invention is shown. System 11 comprises a reference model 20, an estimator 30, a vehicle level brake/steer controller 40, and an actuator controller 50. To implement the principals of the present invention, reference model 20, estimator 30, vehicle level brake/steer controller 40, and an actuator controller 50 may include digital circuitry, analog circuitry, or any combination of digital circuitry and analog circuitry. Also, reference model 20, estimator 30, vehicle level brake/steer controller 40, and an actuator controller 50 may be programmable, a dedicated state machine, or a hybrid combination of programmable and dedicated hardware. Additionally, reference model 20, estimator 30, vehicle level brake/steer controller 40, and an actuator controller 50 may include any control clocks, interfaces, signal conditioners, filters, Analog-to-Digital (A/D) converters, Digital-to-Analog (D/A) converters, communication ports, or other types of operators as would occur to those having ordinary skill in the art to implement the principals of the present invention.

System 11 is incorporated within a processing environment of vehicle 10. However, for the simplicity in describing the present invention, system 11 is illustrated and described as being separate from the processing environment of vehicle 10. Also, for the simplicity in describing the present invention, system 11 will be described herein as if vehicle 10 includes both a front active braking system and a rear active steering system. However, those having ordinary skill in the art will appreciate an applicability of system 11 to a vehicle including only a front active braking system or a rear active steering system.

As known by those having ordinary skill in the art, conventional sensors (not shown) provide a plurality of signals indicative of an operational state of vehicle 10 including, but not limited to, a driver steering wheel angle signal $\delta_{SWA}$, a front steering wheel angle signal $\delta_f$, a rear steering wheel angle signal $\delta_r$, a vehicle yaw rate signal $\Omega$, a lateral acceleration signal $a_y$, a wheel speed signal $W_{S1}$ (from tire 12), a wheel speed signal $W_{S2}$ (from tire 13), a wheel speed signal $W_{S3}$ (from tire 15), a wheel speed signs $W_{S4}$ (from tire 16), and an estimated vehicle speed signal $v_x$.

Reference model 20 inputs driver steering wheel angle signal $\delta_{SWA}$, lateral acceleration signal $a_y$, and estimated vehicle speed signal $v_x$ from conventional sensors (not shown) of vehicle 10. Alternative to lateral acceleration signal $a_y$, reference model 20 can input an estimated surface coefficient of adhesion signal $\mu_e$ from estimator 30. In response to the inputted signals, reference model 20 provides signals indicative of a feedforward front steering angle correction signal $\delta_{fdrl}$, a feedforward rear steering angle correction signal $\delta_{rfl}$, a desired yaw rate signal $\Omega_{dl}$, a desired lateral velocity signal $[^v{}_{yd}]$ $v_{yd1}$, and a desired slip angle signal $\beta_d$.

Estimator 30 inputs front steering wheel angle signal $\delta_f$, rear steering wheel angle signal $\delta_r$, vehicle yaw rate signal $\Omega$, lateral acceleration signal $a_y$, and estimated vehicle speed signal $v_x$ from the conventional sensors of vehicle 10. Estimator 30 further inputs desired yaw rate signal $\Omega_{dl}$ from reference model 20. In response to the inputted signals, estimator 30 provides an estimated surface coefficient of adhesion signal $\mu_e$ an estimated lateral velocity signal $v_{ye}$, and an estimated slip angle signal $\beta_e$.

Vehicle level brake/steer controller 40 inputs front steering wheel angle signal $\delta_f$, rear steering wheel angle signal $\delta_r$, vehicle yaw rate signal $\Omega$. lateral acceleration signal $a_y$ and estimated vehicle speed signal $v_x$ from the conventional sensors of vehicle 10. Controller 40 further inputs desired yaw rate signal $\Omega_d$, desired lateral velocity signal $v_{yd}$, and desired slip angle signal $[\beta_e]$ $\beta_d$ from reference model 20; and estimated surface coefficient of adhesion signal $\mu_e$, estimated lateral velocity signal $v_{ye}$, and estimated slip angle signal $\beta_c$ from estimator 30. In response to the inputted signals, controller 40 provides a desired speed differential signal $\Delta v_{lr3t}$ indicating a desired speed difference between a linear speed of tire 12 and a linear speed of tire 13 (FIGS. 1A–1D) or a desired speed difference between a linear speed of tire 15 and a linear speed of tire 16 (FIGS. 1A–1D). Controller 40 further provides a desired front steering angle signal $\delta_{ftd1}$ indicative of a desired steering angle of front axle 11 (FIGS. 1A–1D), and a desired rear steering angle signal $\delta_{rtd1}$ indicative of a desired steering angle of rear axle 14 (FIGS. 1A–1D).

Controller 40 only provides desired speed differential signal $\Delta v_{lr3t}$ and desired front steering angle $\delta_{ftd1}$ for alternative embodiments of vehicle 10 only having a front active steering system.

Actuator controller 50 inputs desired speed differential signal $\Delta v_{lr3t}$, desired front steering angle signal $\delta_{rtd1}$, and desired rear steering angle signal $\delta_{rtd1}$ from controller 40. Controller 50 further inputs front steering wheel angle signal $\delta_f$, rear steering wheel angle signal $\delta_r$, wheel speed signal $W_{S1}$, wheel speed signal $W_{S2}$, wheel speed signal $W_{S3}$, and wheel speed signal $W_{S4}$ from the conventional sensors of vehicle 10. In response to the inputted signals, actuator controller 50 compares desired tire speed differential signal $\Delta v_{lr3t}$ to either a speed differential between tire 12 and tire 13 (FIGS. 1A–1D) as indicated by wheel speed signs $WS_{S1}$ and wheel speed signs $WS_{S2}$ as would occur to those having ordinary skill in the art, or a speed differential between tire 15 and tire 16 (FIGS. 1A–1D) as indicated by wheel speed signs $WS_{S3}$ and wheel speed signs $WS_{S4}$ as would occur to those having ordinary skill in the art. The result is a corrective braking signal $T_b$ that is provided to a braking system (not shown) of vehicle 10. In one embodiment of vehicle 10, a brake actuator of the braking system appropriately adjusts brake pressure to a corresponding brake in response to corrective braking signal $T_b$ as would occur to those having ordinary skill in the art.

Actuator controller 50 compares desired front steering angle signal $\delta_{ftd1}$ and front steering wheel angle signal $\delta_f$ as would occur to those with ordinary skill in the art, and compares desired rear steering angle signal $\delta_{rtd1}$ and rear steering wheel angle signal $\delta_r$ as would occur to those with ordinary skill in the art to thereby provide a corrective front steering signal $T_{fs}$ and a corrective rear steering signal $T_{rs}$ to a steering system (not shown) of vehicle 10. In one embodiment of vehicle 10, a front steering actuator of the steering system adjusts a position of a steering rack for axle 11 (FIGS. 1A–1D) in response to corrective front steering signal $T_{fs}$ and a rear steering actuator of the steering system adjusts a position of a steering rack for axle 14 (FIGS. 1A–1D) in response to corrective rear steering signal $T_{rs}$.

Figure 3:
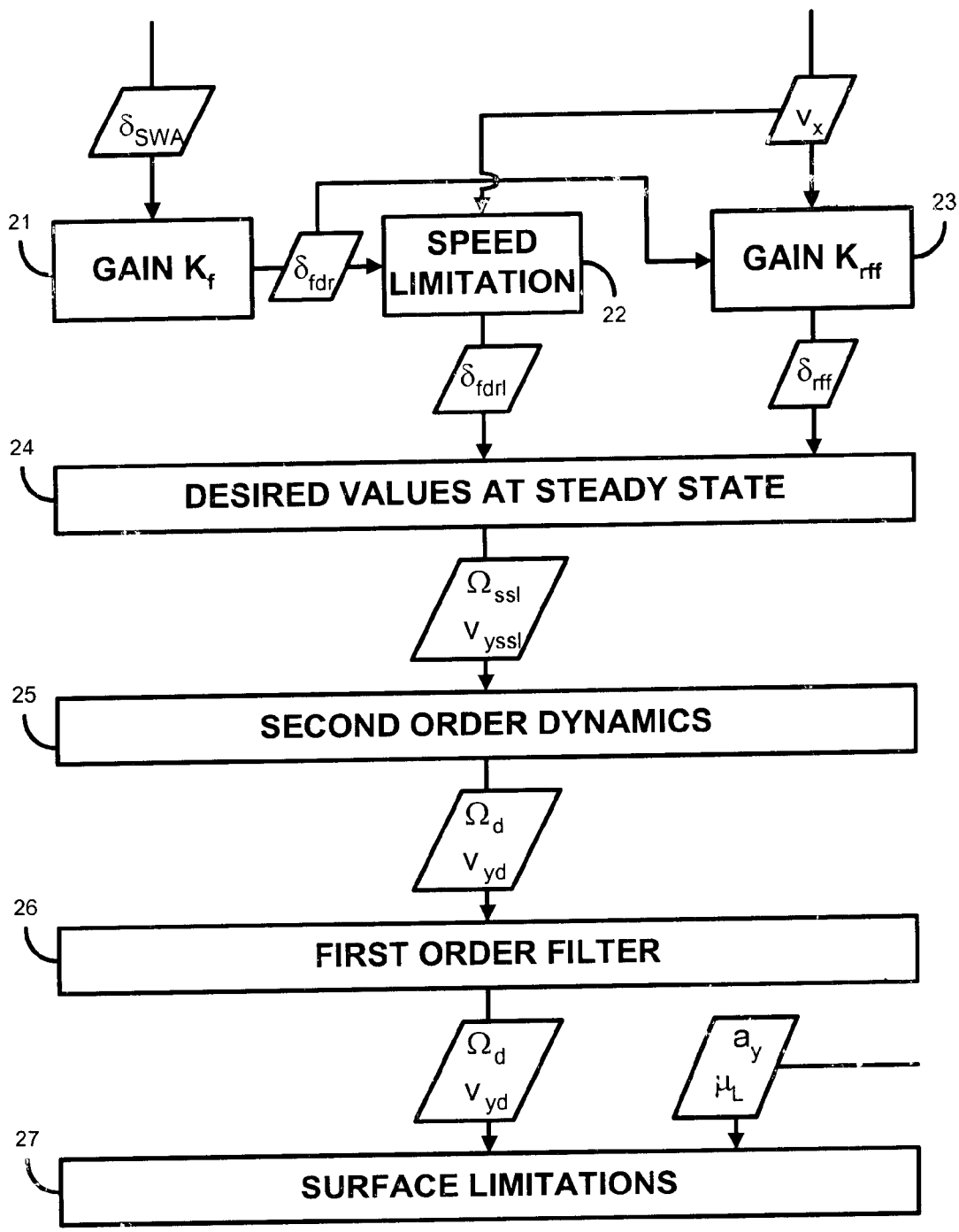
FIG. 3 is a block diagram of one embodiment of a vehicle reference model of FIG. 2 in accordance with the present invention.

Referring to FIG. 3, one embodiment of reference model 20 in accordance with the present invention is shown. A block 21 converts steering wheel angle signal $\delta_{SWA}$ into a corresponding angle of front tires signal $\delta_{fdr}$ as computed by the following equation (14):

$$\delta_{fdr} = \delta_{SWA} * K_f(v_x) \tag{14}$$

where $K_f(v_x)$ is a ratio between the angle of rotation of a steering wheel of vehicle 10 (FIGS. 1A–1D) and front wheels 12 and 13 (FIGS. 1A–1D). In the case of active front steer, front ratio $K_f(v_x)$ may be speed dependent, for example decreasing with speed to promote maneuverability at low speeds and stability at high speeds.

A block 22 determines a feedforward part of a steering angle correction by limiting a magnitude of front tire steering angle $\delta_{fdr}$ to a reasonable level. A desired value of lateral acceleration is computed from the following equation (15):

$$a_{yd} = (v_x^2 * \delta_{fdr})/(L + K_u * v_x^2) \tag{15}$$

where L is a vehicle tirebase and $K_u$ is an understeer coefficient. It follows from equation (15) that in order to limit a magnitude of this acceleration to a reasonable level $a_{ydmax}$ (an example value of $\alpha_{ydmax}$ is 12 m/s²), a magnitude of steering angle $\delta_{fdr}$ has to be limited in accordance with the following equation (16):

$$|\delta_{fmax}| = |a_{ydmax}| * (L + K_u * v_x^2)/v_x^2 \qquad (16)$$

This limiting can be interpreted as adding a feedforward term to the steering angle $\delta_{fff}$, as given by the following equation (17):

$$\delta_{fff} = \begin{cases} 0 & \text{if } |\delta_{fdr}| \le \delta_{fmax}(v_x) \\ [\delta_{fmax}(v_x) - |\delta_{fdr}|] * \text{sign}(\delta_{fdr}) & \text{if } |\delta_{fdr}| > \delta_{fmax}(v_x) \end{cases} \qquad (17)$$

After the limitation, front steering angle $\delta_{fdr1}$ desired by the driver is computed from the following equation (18):

$$\delta_{fdr1} = \delta_{fdr} + \delta_{fff} \qquad (18)$$

When vehicle 10 is equipped with a traditional steering mechanism, the ratio $K_f$ does not depend on speed of vehicle 10 and the limitation of the steering angle cannot be performed(i.e., $\delta_{fdr1} = \delta_{fdr}$).

A block 23 determines a feedforward part of the rear tire steering angle $\delta_{rff}$ as computed from the following equation (19):

$$\delta_{rff} = \delta_{fdr} * K_{rff}(v_x) \qquad (19)$$

where $K_{rff}(v_x)$ is a speed dependant gain that must be selected to achieve an improved maneuverability (to reduce radius of curvature and/or driver steering effort) at low speeds, an improved stability at high speeds and a reduction of vehicle side slip velocity (or side slip angle). One possible choice is requiring that the side slip velocity be equal to zero in a steady state maneuver. Side slip velocity $v_{yss}$ is computed by the following equation (20):

$$v_{yss} = [(v_x * \delta_{fdr1})/(L + K_u * v_x^2)] * \{b - M * a * v_x^2/(C_r * L) + K_{rff}(v_x) * [a + M * b * v_x^2/(C_f * L)]\} \qquad (20)$$

where M is mass of vehicle 10, a and b are a distances of vertical axis 17 to front axle 11 and rear axle 14 (FIGS. 1A–1D), respectively, and $C_f$ and $C_r$ are the cornering stiffness coefficients of front tires 12 and 13, and rear tires 15 and 16 (FIGS. 1A–1D), respectively. In order to make side slip velocity $v_{yss}$ equal zero, a feedforward gain $K_{rff}'(v_x)$ is computed by the following equation (21):

$$K_{rff}'(v_x) = -[b - M * a * v_x^2/(C_r * L)]/[a + M * b * v_x^2/(C_f * L)] \qquad (21)$$

Figure 4:
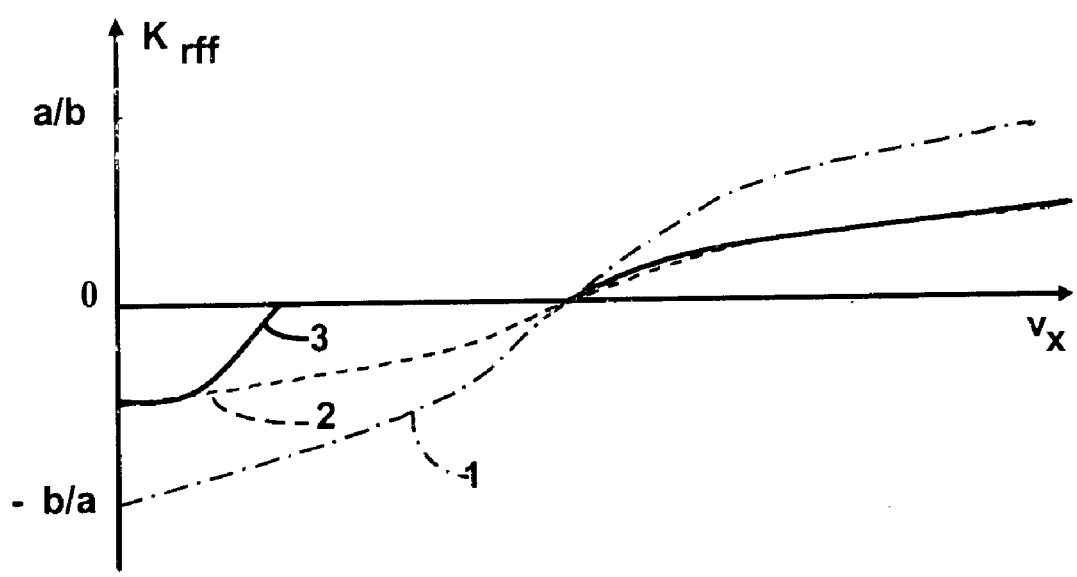
FIG. 4 is a graph illustrating three (3) feedforward gain curves for an active rear steer as a function of a vehicle speed in accordance with the present invention.

Feedforward gain $K_{rff}'(v_x)$ is illustrated in FIG. 4 as curve 1. Gain $K_{rff}'(v_x)$ is negative for small speeds and positive for large speeds and it changes sign at a velocity $v_{xc}$ given by the following equation (22):

$$v_{xc} = [C_r * L * b/(M * a)]^{1/2} \qquad (22)$$

Thus, the sign of the rear tire steering angle $\delta_{rff}$ is opposite to that of the front steering angle $\delta_{fdr1}$ (out of phase steering) at low speeds, which improves maneuverability. At high speeds, rear tires 15 and 16 are steered in phase with the front tires 12 and 13, which improves stability of vehicle 10. In practice, feedforward gain $K_{rff}'(v_x)$ given by equation (21) would require too large rear tire steering angle $\delta_{rff}$, which is typically limited to several degrees. Also, yaw rate $\Omega$ of vehicle 10 during cornering maneuvers would be very limited at high velocities, thus compromising subjective handling feel. To rectify these problems, feedforward gain $K_{rff}'(v_x)$ can be multiplied by a factor $\eta$, which is less than 1 in accordance with the following equation (23):

$$K_{rff}''(v_x) = -\eta * [b - M * a * v_x^2/(C_r * L)]/[a + M * b * v_x^2/(C_f * L)] \qquad (23)$$

with a reasonable value of $\eta = 0.4$ (the optimal value for a given application depends on the range of steering angle for rear tires 15 and 16). Gain $K_{rff}''(v_x)$ given by equation (23) is represented by curve 2 in FIG. 4.

According to equation (22), a velocity $v_{xc}$ at which gain $K_{rff}$ changes sign depends on cornering stiffness $C_r$ of rear tires 15 and 16. On slippery surfaces, the value of the cornering stiffness $C_r$ and the characteristic velocity $v_{xc}$ (at which gain $K_{rff}$ crosses zero) will be reduced. If the gain determined by equation (23) with the nominal values of cornering stiffness coefficient $C_r$ that correspond to a dry surface are used, vehicle 10 will exhibit a tendency to oversteer during driving on slippery surfaces at the velocities just below $v_{xc}$. This is due to out of phase steering increasing a rate of rotation of vehicle 10. To rectify this problem and make the behavior of vehicle 10 acceptable over the entire range of surfaces, the feedforward gain $K_{rff}$ is chosen to be 0 for speed between approximately $0.4 * v_{xc}$ and $v_{xc}$, as illustrated by curve 3 in FIG. 4.

A block 24 determines a steady state desired values of yaw rate $\Omega_{dss}$ and side slip velocity $v_{ydss}$. These values can be computed from look up tables, which are obtained from vehicle testing performed on dry surface. During tests, the feedforward portion of the rear tire steering angle $\delta_{rff}$ must be active and vehicle 10 must be in approximately steady state cornering conditions. Thus, the desired values at a given speed and front steering angle $\delta_f$ represent the values which vehicle 10 achieves on dry surface in steady state cornering with the feedforward portion of the rear tire steer being active. Another way of obtaining the desired values is by using analytical models. For example, the steady state values of yaw rate $\Omega_{dss}$ and side slip velocity $v_{ydss}$ can be computed from the following equations (24) and (25):

$$\Omega_{dss} = [1 - K_{rff}(v_x)] * v_x * \delta_{fdr1}/[L + K_u * v_x^2] \qquad (24)$$

$$v_{ydss} = [(v_x * \delta_{fdr1})/(L + K_u * v_x^2)] * \{b - M * a * v_x^2/(C_r * L) + K_{rff}(v_x) * [a + M * b * v_x^2/(C_f * L)]\} \qquad (25)$$

In the equations (24) and (25), an understeer coefficient $K_u$ depends on the magnitude of lateral acceleration $a_y$. When vehicle 10 is without active rear tire steer, feed forward gain $R_{rff} = 0$. Since yaw rate $\Omega_{dss}$ and side slip velocity $v_{ydss}$ are overestimated at large steering angles by equations (24) and (25), the desired values obtained from equations (24) and (25) must be limited. A reasonable maximum value for a magnitude of yaw rate $\Omega_{dss}$ can be computed from the following equation (26):

$$\Omega_{dmax} = g/v_x \qquad (26)$$

where g is acceleration of gravity. The limited value of a desired yaw rate $\Omega_{dss1}$ can be computed from the following equation (27):

$$\Omega_{dss1} = \begin{cases} \Omega_{dss} & \text{if } |\Omega_{dss}| \le g/v_x \\ (g/v_x) * \text{sign}(\Omega_{dss}) & \text{if } |\Omega_{dss}| > g/v_x \end{cases} \qquad (27)$$

The limited value of lateral velocity $v_{ydss1}$ can be computed from the following equation (28):

$$v_{ydss1} = [\Omega_{dss}/(1 - K_{rff})] * \{b - M * a * v_x^2/(C_r * L) + K_{rff} * [a + M * b * v_x^2/(C_r * L)]\} \qquad (28)$$

A block 25 receives steady state yaw rate $\Omega_{dss1}$ and lateral velocity $v_{ydss1}$. Block 25 represents a desired dynamics of vehicle 10 and the delay in the generation of tire lateral forces. In the linear range of handling, the transfer functions between front steering angle $\delta_{fdr1}$ and desired yaw rate $\Omega_d$ and between front steering angle $\delta_{fdr1}$ and desired lateral velocity $v_{yd}$ can be computed by the following equations (29) and (30):

$$G_\Omega(s)=\Omega_d(s)/\delta_{fdr1}(s)=(C_f/M)*[s-z_\Omega(v_x)]/[s^2+2*\zeta(v_x)*\omega_n(v_x)*s+\omega_n^2(v_x)] \quad (29)$$

$$G_{vy}(s)=v_{yd}(s)/\delta_{fdr1}(s)=(a*C_f/I_{zz})*[s-z_{vy}(v_x)]/[s^2+2*\zeta(v_x)*\omega_n(v_x)*s+\omega_n^2(v_x)] \quad (30)$$

In equations (29) and (30), s is the Laplace operand, $I_{zz}$ is the moment of inertia of vehicle 10 about axis 17, $z_\Omega(v_x)$ and $z_{vy}(v_x)$ are zeros of the corresponding transfer functions, $\zeta(v_x)$ is the damping coefficient, and $\omega_n(v_x)$ is the undamped natural frequency.

When vehicle 10 has active rear tire steer, the zeros of the transfer functions depend on feedforward gain $K_{rff}$. Each one of the above transfer functions can be represented as a product of a steady-state value (corresponding to s=0) and a term representing the dynamics can be computed by the following equations (31) and (32):

$$G_\Omega(s)=(\Omega_{dss}/\delta_{fss})*G_\Omega'(s) \quad (31)$$

$$G_{vy}(s)=(v_{yss}/\delta_{fss})*G_{vy}'(s) \quad (32)$$

Where $$G_\Omega'(s)=[-\omega_n^2(v_x)/z_\Omega(v_x)]*[s-z_\Omega(v_x)]/[s^2+2*\zeta(v_x)*\omega_n(v_x)*s+\Omega_n^2(v_x)] \quad (33)$$

$$G_{vy}'(s)=[-\omega_n^2(v_x)/z_{vy}(v_x)]*[s-z_{vy}(v_x)]/[s^2+2*\zeta(v_x)*\omega_n(v_x)*s+\omega_n^2(v_x)] \quad (34)$$

Thus, the dynamic values of the desired yaw rate $\Omega_d$ and lateral velocity $v_{yd}$ can by obtained by passing the steady state values through the differential (or difference) equations (with parameters dependent on speed) representing the dynamics of the transfer functions $G_\Omega(s)$ and $G_{vy}(s)$, In a block 26, the values of desired yaw rate $\Omega_d$ and side slip velocity $v_{yd}$ are subsequently passed through first order filters representing a delay in generating tire forces due to tire relaxation length. Block 26 can be represented as a transfer function in accordance with the following equation (35):

$$G_f(s)=a_f(v_x)/[s+a_f(v_x)] \quad (35)$$

in which a filter parameter $a_f(v_x)$ is speed dependent. In the case of vehicle 10 having active rear tire steer, one of the control objectives is to achieve quick response of vehicle 10 to steering inputs. Thus, in this case, the dynamics of vehicle 10 as represented by the transfer functions (31) and (32) can be ignored, since vehicle 10 can respond faster to steering inputs with active rear steer than a conventional vehicle.

The desired values of yaw rate $\Omega_d$ and lateral velocity $v_{yd}$ obtained as outputs of block 26 may be subsequently limited in magnitude by a block 27 depending an the surface conditions. A block 27 can utilize either an explicit estimate of surface coefficient of adhesion in lateral direction $\mu_L$ or a magnitude of lateral acceleration $a_y$. In the first case, a limited value of desired yaw rate $\Omega_{dl}$ is computed from the following equation (36):

$$\Omega_{dl} = \begin{cases} \Omega_d & \text{if } |\Omega_d| \leq \mu_L * g / v_x \\ (\mu_L * g / v_x) * \text{sign}(\Omega_d) & \text{if } |\Omega_d| > \mu_L * g / v_x \end{cases} \quad (36)$$

If the magnitude of lateral acceleration $a_y$ is used by block 27, the limited desired yaw rate $\Omega_{dl}$ (FIG. 2) is computed from the following equation (37):

$$\Omega_{dl} = \begin{cases} \Omega_d & \text{if } |\Omega_d| \leq (|a_y| + \Delta a_y)/v_x \\ [(|a_y| + \Delta a_y)/v_x]*\text{sign}(\Omega_d) & \text{if } |\Omega_d| > (|a_y| + \Delta a_y)/v_x \end{cases} \quad (37)$$

where $\Delta a_y$ is a constant positive value, for example 2 m/s². The magnitude of desired lateral velocity $[v_{yd}]v_{yd1}$ (FIG. 2) is limited by the value obtained from equation (26) with the desired yaw rate at steady state $\Omega_{dss}$ replaced by the limited desired yaw rate $\Omega_{dl\_}$ Block 27 also outputs a desired side slip angle $\beta_d$ (FIG. 2) that can be computed as an arctangent function of the ratio of desired lateral velocity to longitudinal velocity in accordance with the following equation (38):

$$\beta_d=\text{Arctan}(v_{yd}/v_x) \quad (38)$$

Figure 5:
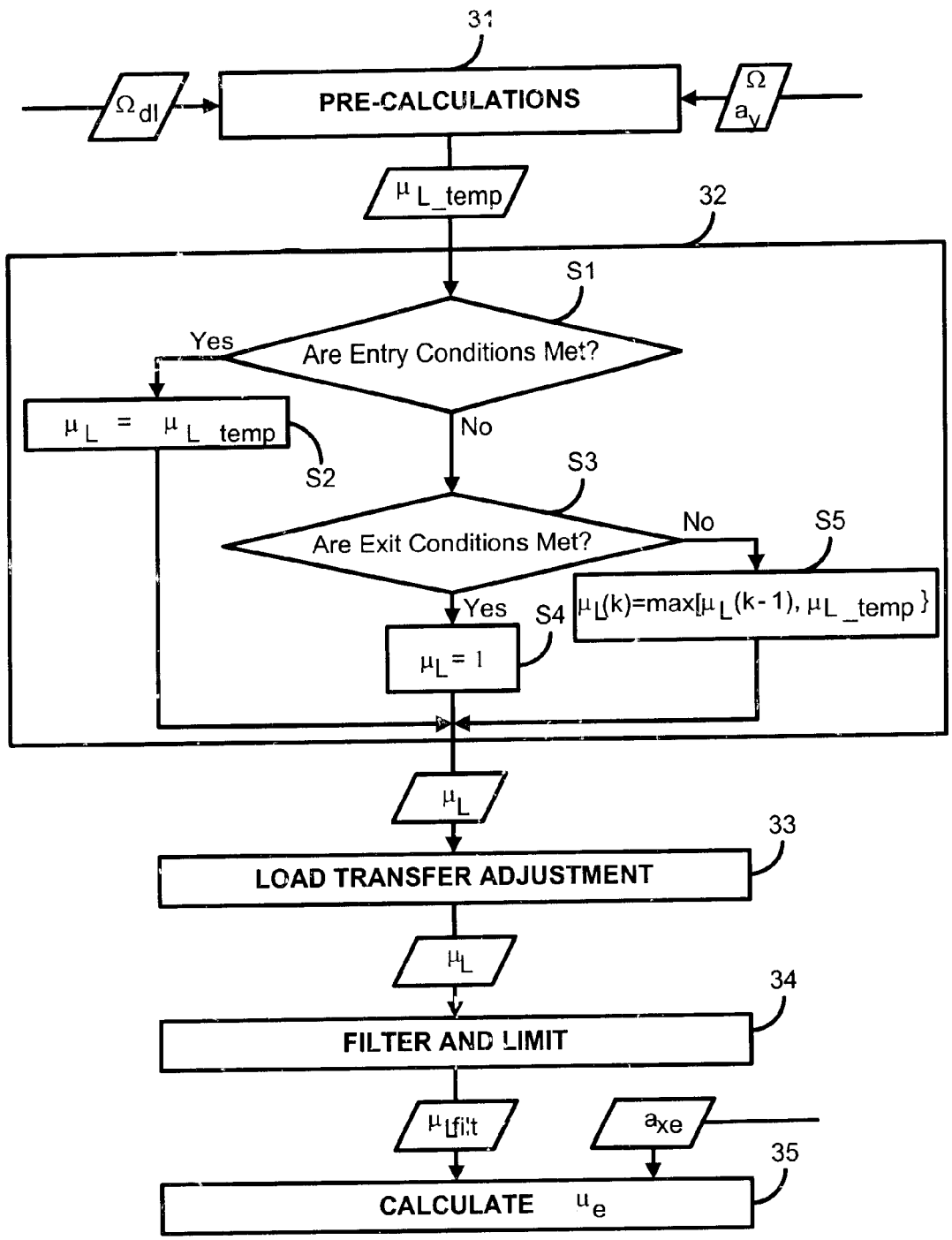
FIG. 5 is a block diagram of one embodiment of a surface coefficient estimator in accordance with the present invention.

Referring to FIG. 5, an embodiment of estimator 30 (FIG. 2) for estimating surface coefficient of adhesion fie is shown. A block 31 performs preliminary calculations. First, it is recognized that the most robust signal available is yaw rate $\Omega$, and an entry and an exit conditions are dependent mainly on a yaw rate error, i.e. a difference between the desired yaw rate $\Omega_{d1}$ and measured yaw rate $\Omega$, and to a lesser extent on measured lateral acceleration $a_y$ (entry condition only). Thus, a yaw rate error is calculated and filtered, and lateral acceleration $a_y$ is filtered.

Second, when vehicle 10 (FIGS. 1A–1D) reaches the limit of adhesion in a steady turn, a surface coefficient of adhesion can be determined as a ratio of the magnitude of a filtered lateral acceleration $a_{yfilt}$ to a maximum lateral acceleration $a_{ymax}$ that vehicle 10 can sustain on dry pavement as shown in the following equation (39):

$$\mu_{L\_temp}=|a_{yfilt}|/a_{ymax} \quad (39)$$

where $\mu_{L\_temp}$ is a temporary estimate of surface coefficient of adhesion in the lateral direction, and $a_{yfilt}$ is filtered lateral acceleration, which is also corrected for the effects of measured gravity components resulting from vehicle body roll and bank angle of the road.

A block 32 is designed to recognize situations when vehicle 10 operates at or close to the limit of adhesion and estimates a lateral surface coefficient of adhesion $\mu_L$ from measured lateral acceleration $a_y$. This estimate is calculated by identifying one of the following three conditions.

First, entry conditions are tested during a stage S1. Entry conditions are when vehicle 10 is handling at the limit of adhesion and is not in a quick transient maneuver. Under entry conditions, stage S2 sets coefficient of adhesion $\mu_L$ equal to temporary estimate of surface coefficient of adhesion $\mu_{L\_temp}$ as calculated by equation (37).

Second, exit conditions are tested during a stage S3. Exit conditions indicate vehicle 10 is well below the limit of adhesion (within the linear range of handling behavior). Under exit conditions, a stage S4 resets coefficient of adhesion $\mu_L$ to a default value of 1.

Third, when neither the entry conditions nor the exit conditions are met, a stage S5 holds coefficient of adhesion $\mu_L$ unchanged from a previous value (i.e. holding conditions). The only exception is when the magnitude of measured lateral acceleration $a_y$ exceeds the maximum value predicted using currently held estimate. In this case, stage S5 calculates coefficient of adhesion $\mu_L$ as if vehicle 10 was in an entry condition.

The entry conditions are met during stage S1 when the following three (3) conditions are simultaneously satisfied. The first condition is either (1) the magnitude of the yaw rate error, that is the difference between the desired yaw rate $\Omega_d$ and the measured yaw rate $\Omega$ being greater than a threshold as computed in the following equation (40):

$$|\Omega_d - \Omega|_{filt} > \text{Yaw\_threshold1} \qquad (40)$$

where the typical value of Yaw_Thershold1 is 0.123 rad/s=7 deg/s); or (2) the magnitude of yaw rate error being greater than a lower threshold Yaw_Threshold2 for some time Te as computed in the following equation (41):

$$|\Omega_d - \Omega|_{filt} > \text{Yaw\_Threshold2 for Te seconds} \qquad (41)$$

where Yaw_Threshold2 depends on the magnitude of desired yaw rate $\Omega_d$ or measured yaw rate $\Omega$. For example, Yaw_Threshold2=4deg/s+5*$|\Omega_d|$=0.07rad/s+0.09*$|\Omega_d|$, where $\Omega_d$ is the desired yaw rate in [rad/s]. A typical value of the time period Te for which this condition must be satisfied is 0.3 sec. The threshold Yaw_Threshold1 used in equation (40) may also depend on the magnitude of desired yaw rate $\Omega_d$ or measured yaw rate $\Omega$.

The second condition is the signs of the filtered lateral acceleration $a_{y\,filt1}$ and the weighted sum of yaw rate $\Omega$ and the derivative of yaw rate are the same in accordance with the following mathematical expression (42):

$$a_{yfilt1}*(\Omega + \text{Yaw\_Der\_Mult}*d\Omega/dt) > \text{Sign\_Comp} \qquad (42)$$

where $\Omega$ is the measured yaw rate and $d\Omega/dt$ is its derivative. The magnitude of the filtered lateral acceleration $a_{yfilt}$ is limited from equation (43):

$$a_{yfilt1} = \begin{cases} a_{yfilt1} & \text{if } |a_{yfilt}| \geq a_{ymin} \\ a_{ymin} * \text{sign}(\Omega_d) & \text{if } |a_{yfilt}| < a_{ymin} \end{cases} \qquad (43)$$

where $a_{ymin}$ is a constant with a typical value of 0.2 m/s². Thus if $a_{yfilt}$ is very small in magnitude, it is replaced by the $a_{ymin}$ with a sign the same as the desired yaw rate $\Omega_d$. This limit is needed to improve estimation on very slick surfaces (e.g. ice) when the magnitude of lateral acceleration $a_y$ is comparable to the effect of noise, so that the sign of $a_{yfilt}$ cannot be established.

The recommended values in equation (42) for the constant Yaw_Der_Mult is 0.5 and for Sign_Comp is 0.035 (if $\Omega$ is in rad/s and $d\Omega/dt$ in rad/s²).

In order to allow lateral acceleration $a_y$ to fully build up at the beginning of maneuver and after each change in sign, before it can be used for estimation of surface coefficient $\mu_L$, a condition is used that requires both the desired yaw rate $\Omega_{d1}$ and lateral acceleration $a_y$ to have the same signs for a specific time period (necessary for the acceleration to build up). In order to keep track of how long the desired yaw rate $\Omega_d$ and lateral acceleration $a_y$ have had the same signs, a timer is introduced. In accordance with an equation (44), the timer becomes zero when the desired yaw rate $\Omega_d$ and lateral acceleration $a_y$ have opposite signs and counts the time that elapses from the moment the signs become and remain the same.

$$timer = \begin{cases} 0 & \text{when } \Omega_d * a_{yfilt1} < \text{Ay\_sign\_comp} \\ timer + \text{loop\_time} & \text{otherwise} \end{cases} \qquad (44)$$

where $\Omega_d$ is the desired yaw rate in [rad/s] and Ay_sign_comp is a constant with a typical value of 0.2 m/s³.

The third condition is either (1) the signs of the desired yaw rate $\Omega_d$ and measured lateral acceleration $a_y$ are the same and they have been the same for some time in accordance with following equation (45):

$$timer > \text{hold\_time} \qquad (45)$$

The hold_time in equation (42) can be 0.25 s, or (2) the magnitude of a derivative of lateral acceleration $da_y/dt$ is less than a threshold in accordance with the following mathematical equation (46):

$$|da_y/dt| Ay\_Der\_Thresh \qquad (46)$$

A recommended value of the threshold, Ay_Der_Thresh= 2.5 m/s³. The derivative $da_y/dt$ is obtained by passing filtered lateral acceleration $a_{yfi1}$ through a high pass filter with a transfer function $a_f*s/(s+a_f)$ with a typical value of $a_f$=6 rad/s.

The exit conditions are met during stage S3 when the following two (2) conditions are simultaneously satisfied. The first condition is the magnitude of yaw rate error filtered is less than or equal to a threshold as illustrated in the following equation (47):

$$|\Omega_d - \Omega|_{filt} \leq \text{Yaw\_Threshold3} \qquad (47)$$

with a typical value of Yaw_Threshold3=0.10 rad/s.

The second condition is a low-pass filtered version of the magnitude of the yaw rate error is less than or equal to a threshold as illustrated in the following equation (48):

$$(|\Omega_d - \Omega|_{filt})_{filt} \leq \text{Yaw}\_\text{Treshold}4 \qquad (48)$$

where the value of Yaw_Threshold4=0.06 rad/s is recommended and the filter is a first order filter with a cutoff frequency of 1.8 rad/s, e.g. a filter with a transfer function $a_f/(s+a_f)$ with $a_f$=1.8 rad/s). The thresholds Yaw_Threshold3 and Yaw_Thereshold4 may depend on the magnitude of desired yaw rate $\Omega_d$ or the measured yaw rate $\Omega$.

A block 33 corrects surface estimate $\mu_L$ for load transfer. Because of the effects of load transfer to the outside tires during cornering, which is smaller on slippery surfaces than on dry roads, lateral acceleration $a_y$ is not directly proportional to the surface coefficient of adhesion $\mu_L$. To account for this effect, the surface estimate $\mu_{L\_temp}$ computed from equation (37), is corrected using the following equation (49):

$$\mu_L = \mu_{L\_temp} * (c_1 + c_2 * \mu_{L\_temp}) \qquad (49)$$

where $c_1 < 1$ and $c_2 = 1 - c_1$, so that on dry surface $\mu_L = \mu_{L\_temp} = 1$, while on slippery surfaces $\mu_L < \mu_{L\_temp}$. Example values are $c_1$=0.85 and $c_2$=0.15.

A block 34 limits surface estimate $\mu_L$ from below by a value $\mu_{Lmin}$ (a typical value 0.07) and may be limited from above by $\mu_{Lmax}$ (a typical value 1.2). Surface estimate $\mu_L$ can be passed through a slew filter, which limits the rate of change of the estimate to a specified value, for example 2/sec, or a low pass filter.

A block 35 estimates total surface coefficient of adhesion $\mu_e$ using the following equation (50):

$$\mu_e = \begin{cases} \mu_{Lfilt} & \text{when } |a_{xe}| \leq \text{Ax\_Dz} \\ \{(\mu_{Lfilt})^2 + [(|a_{xe}| - \text{Ax\_DZ})/a_{xmax}]^2\}^{1/2} & \text{when } |a_{xe}| > \text{Ax\_Dz} \end{cases} \quad (50)$$

where Ax_Dz is the dead-zone applied to the estimated longitudinal acceleration (a typical value is 2m/s$^2$) and $a_{xmax}$ is a maximum longitudinal deceleration which vehicle 10 can achieve on dry surface (a typical value is 9 m/s$^2$). The square root function in the above expression can be replaced by a simplified linear equation or by a look-up table. The estimate is finally limited from below by $\mu_{emin}$ (typical value is 0.2) and from above by $\mu_{emax}$ (1.0).

The (unfiltered) estimate of surface coefficient in lateral direction, $\mu_L$, was found to be good for estimation of vehicle side slip angle. However, for control purposes, the estimate of the surface coefficient in lateral direction may be too low in some situations (for example during heavy braking on slick surfaces) and may cause unnecessary tight control of slip angle. Therefore, for the purpose of control the estimated surface coefficient is increased when the magnitude of the estimated vehicle longitudinal acceleration exceeds certain value. Note that separate thresholds on yaw rate error for the entry and exit conditions are used, with the thresholds on the exit conditions being a little tighter.

Figure 6:
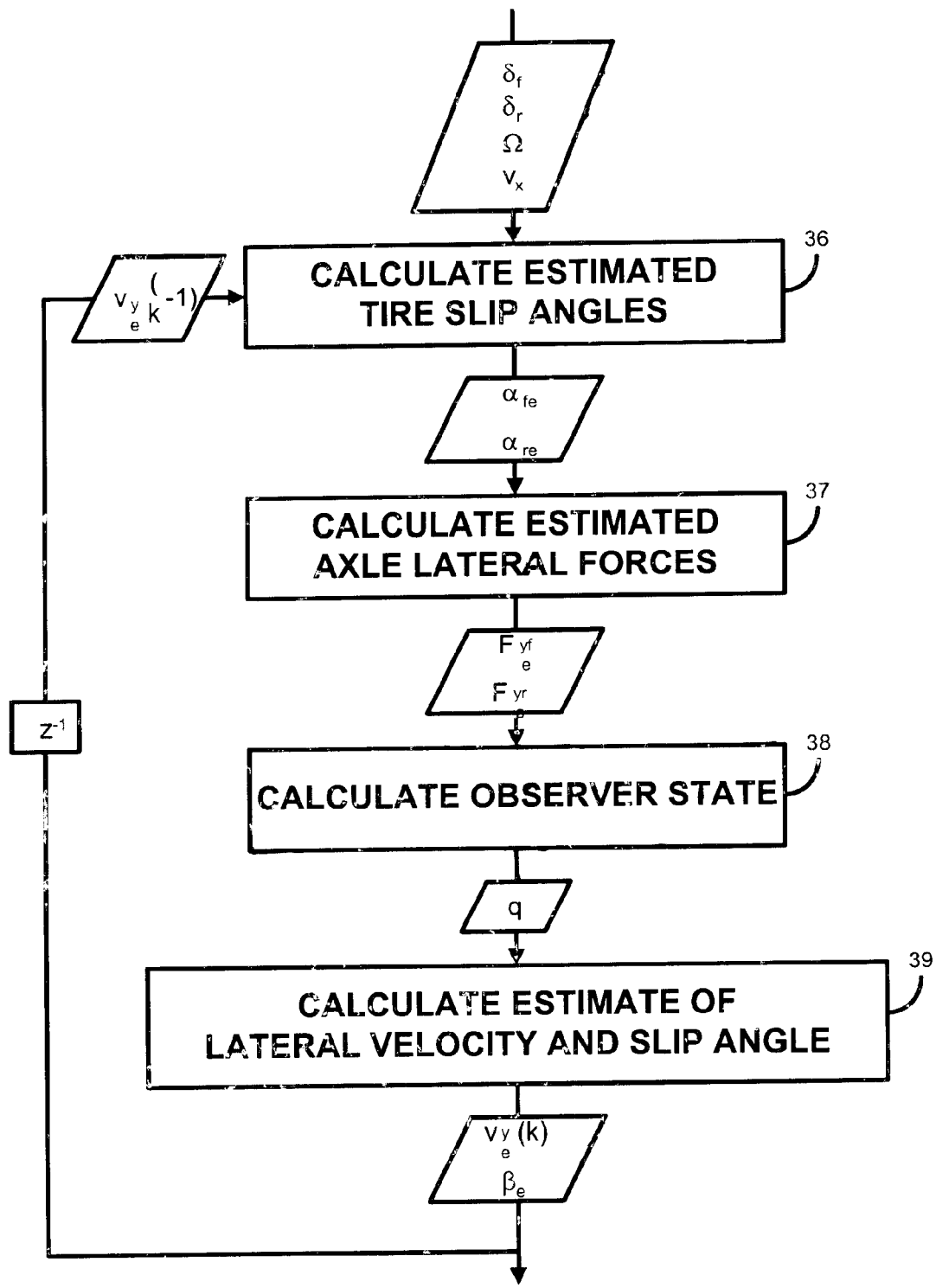
FIG. 6 is a block diagram of one embodiment of a side slip velocity estimator in accordance with the present invention.

Referring to FIG. 6, an embodiment of estimator 30 (FIG. 2) for estimating the actual lateral velocity and slip angle of vehicle 10 (FIGS. 1A–1D) as a function of front steering wheel angle signal $\delta_f$, rear steering wheel angle signal $\delta_r$, yaw rate signal $\Omega$, estimated vehicle speed signal $v_x$, and the estimated lateral surface coefficient of adhesion $\mu_L$ is shown. The slip angle estimation implements an iterative nonlinear closed loop observer to determine the estimated vehicle lateral velocity $v_{ye}$ and slip angle $\beta_e$.

A block 36 of the observer estimates the side slip angles of front axle 11 and rear axle 14 using the following equations (51a) and (51b):

$$\alpha_{fe} = [v_{ye}(k-1) + a^*\Omega]/v_x - \delta_f \quad (51a)$$

$$\alpha_{re} = [v_{ye}(k-1) - b^*\Omega]/v_x - \delta_r \quad (51b)$$

where $v_{ye}(k-1)$ is the estimated lateral velocity from the previous iteration of the observer, and $\alpha_{fe}$ and $\alpha_{re}$ the estimated front and rear axle side slip angles, respectively. The steering angles $\delta_f$ and $\delta_r$ are the actual (measured) steering angles of front tires 12 and 13, and rear tires 15 and 16, respectively, including the corrective terms.

A block 37 of the observer estimates lateral forces $F_{yfe}$ of the front axle 11 according to one of two functions as illustrated in the following equation (52):

$$F_{yfe} = \begin{cases} -C_f * \alpha_{fe} * (1 - (b_{cf} * (|\alpha_{fe}|/\mu_L))), & \text{if } |\alpha_{fe}| < \mu_L * \alpha_{f^*} \\ -N_{f^*} * (|\alpha_{fe}|/\alpha_{fe}) * [\mu_L + s_f * (|\alpha_{fe}|/\alpha_{f^*} - \mu_L)] & \text{if } |\alpha_{fe}| \geq \mu_L * \alpha_{f^*} \end{cases} \quad (52)$$

where $s_f$ is a small non-negative number (the slope of the $F_{yf}-\alpha_f$ curve at the limit of adhesion), e.g., $s_f=0.05$, and where $\alpha_{f^*}$ is defined by the following equation (53):

$$\alpha_{f^*} = 1/(2*b_{cf}) \quad (53)$$

where $b_{cf}$ is defined by the following equation (54):

$$b_{cf} = C_f/(4*N_{f^*}), \quad (54)$$

where $N_{f^*}$ is defined by the following equation (55):

$$N_{f^*} = M*b*(a_{ymax} + \Delta_a)/(a+b) \quad (55)$$

where $a_{ymax}$ is the maximum lateral acceleration that vehicle 10 can sustain on a dry surface in m/s$^2$ and $\Delta_a$ is a positive constant, e.g., $\Delta_a=0.5$ m/s$^2$. M is the nominal value of the total vehicle mass.

The observer similarly estimates lateral forces $F_{yre}$ of the rear axle 14 according to the following equation (56):

$$F_{yre} = \begin{cases} -C_r * \alpha_{re} * (1 - b_{cr} * |\alpha_{re}|), & \text{if } |\alpha_{re}| < \mu_L * \alpha_{r^*} \\ -N_{r^*} * (|\alpha_{re}|/\alpha_{re}) * [\mu_L + s_r * (|\alpha_{re}|/\alpha_{r^*} - \mu_L)], & \text{if } |\alpha_{re}| \geq \mu_L * \alpha_{r^*} \end{cases} \quad (56)$$

where $s_r$ is a small non-negative number, e.g., $s_r=0.05$ and where $\alpha_{r^*}$ is defined by the following equation (57):

$$\alpha_{r^*} = 1/(2*b_{cr}) \quad (57)$$

where $b_{cr}$ is defined by the following equation (58):

$$b_{cr} = C_r/(4*N_{r^*}), \quad (58)$$

where $N_{r^*}$ is defined by the following equation (59):

$$N_{r^*} = M*a*(a_{ymax} + \Delta_a)/(a+b). \quad (59)$$

A block 38 of the observer then estimates a state variable q(k) related to lateral velocity according to the following equation (60):

$$q(k) = q(k-1) + \Delta t * \{-(1+g_2)*v_x*\Omega + ((1+g_3)/M - a*g_1/I_{zz})*F_{yfe} + [(1+g_3)/M + b_1/I_{zz}]*F_{yre} + (g_2-g_3)*a_y - g_4*\Delta A_{yf}\} \quad (60)$$

where $\Delta A_y$ is defined by the following equation (61):

$$\Delta A_y = a_y - (F_{yfe} + F_{yre})/M, \quad (61)$$

and $\Delta A_{yf}$ is $\Delta A_y$ passed through a first order digital low pass filter, for example, with a cut off frequency of 1 rad/s.

A block 39 of the observer uses state variable q(k) to determine estimates of lateral velocity $v_{ye}$ and slip angle $\beta_e$ using equations (62) and (63):

$$v_{ye}(k) = [q(k) + g_1*\Omega_a]/(1+g_2) \quad (62)$$

$$\beta_e = \text{Arctan}[v_{ye}(k)/v_x]. \quad (63)$$

The gains $g_1$, $g_2$, $g_3$ and $g_4$ are tuning parameters preset by a system designer, typically through experimentation on a test vehicle, and may vary from implementation to implementation. The estimated lateral velocity $v_{ye}$ and the estimated slip angle $\beta_e$ are the main outputs of the observer.

Figure 7:
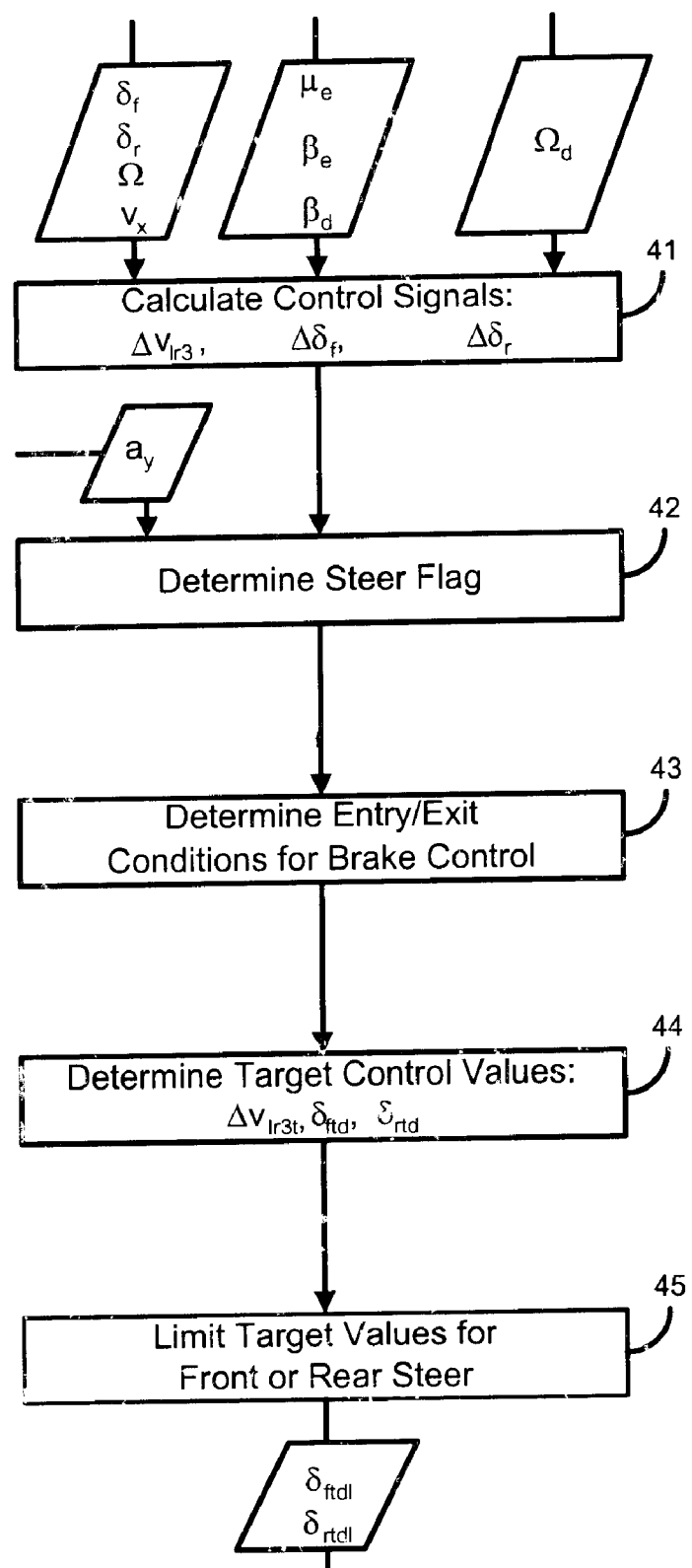
FIG. 7 is a block diagram of one embodiment of a vehicle level brake/steer controller in accordance with the present invention.

Referring to FIG. 7, one embodiment of controller 40 in accordance with the present invention is shown. In controller 40, an overall corrective yaw moment is determined and expressed in terms of a desired speed differential signal $\Delta v_{lr3t}$ (which is achieved by differential braking) between either front tire 12 and front tire 13 (FIGS. 1A–1D), or rear tire 15 and rear tire 16 (FIGS. 1A–1D). The corrective yaw moment is also expressed in terms of a summation of front steer angle correction signal $\Delta \delta_f$ and front steering angle signal $\delta_{fdr1}$ (FIG. 2) to form the total front steering angle signal $\delta_{ftd}$ and in terms of a summation of rear steer angle correction signal $\Delta \delta_r$ and rear steering angle signal $\delta_{rff}$ (FIG. 2) to form the total desired rear steer angle signal $\delta_{rtd}$. The magnitudes of total desired rear steer angle signal $\delta_{rtd}$ and the total desired front steering angle signal $\delta_{rtd}$ may be subsequently limited to desired rear steering angle signal $\delta_{rtd1}$ and desired front steering angle signal $\delta_{ftd1}$, respectively.

A block 41 calculates desired speed differential signal $\Delta v_{lr3}$, front steer angle correction signal $\Delta \delta_f$ and rear steer angle correction signal $\Delta \delta_r$. The corrective yaw moment is obtained by a feedback control operating on the yaw rate error and the side slip velocity (or side slip angle) error. The yaw rate error $\Omega_d - \Omega$ is the difference between the desired yaw rate signal $\Omega_d$ and measured yaw rate signal $\Omega$. Similarly, the side slip velocity error is the difference between the desired side slip velocity signal $v_{yd}$ and the estimated side slip velocity signal $v_{ye}$. The control law is essentially a PD (proportional and derivative) feedback control law, in which the control gains depend on vehicle speed signal $v_x$, estimated surface coefficient of adhesion signal $\mu_e$, and on the magnitude of the estimated vehicle slip angle error. Thus, for the delta velocity signal $\Delta v_{lr3}$, the control law equation (64) may be written as follows:

$$\Delta v_{lr3} = k_{\Omega p}(v_x,\mu_e)*(\Omega_d-\Omega) + k_{\Omega d}(v_x,\mu_e)*d(\Omega_d-\Omega)/dt + k_{vyp}(v_x,\mu_e,|\beta_d-\beta_e|)*(v_{yd}-v_{ye}) + k_{vyd}(v_x,\mu_e,|\beta_d-\beta_e|)*d(v_{yd}-v_{ye})/dt \quad (64)$$

where $k_{\Omega p}(v_x,\mu_e)$ and $k_{\Omega d}(v_x,\mu_e)$ are the proportional and derivative yaw rate gains, while $k_{vyp}(v_x,\mu_e,|\beta_d-\beta_e|)$ and $k_{vyd}(v_x,\mu_e,|\beta_d-\beta_e|)$ are the proportional and derivative lateral velocity gains. The magnitudes of the gains for each velocity and surface coefficient are tuned through vehicle testing and are implemented as look up tables. Typically, the proportional yaw rate gain $k_{\Omega p}(v_x,\mu_e)$ and derivative yaw rate gain $k_{\Omega d}(v_x,\mu_e)$ increase nearly proportionally with vehicle speed $v_x$ and decrease as the estimated surface coefficient of adhesion $\mu_e$ increases. The lateral velocity gains, $k_{vyp}(v_x,\mu_e,|\beta_d-\beta_e|)$ and $k_{vyd}(v_x,\mu_e,|\beta_d-\oplus_e|)$, increase with vehicle speed and increase quite rapidly on slippery surfaces. This is done to provide a proper balance between yaw control and side slip control. On dry surfaces, the yaw rate feedback control usually dominates to achieve responsive handling, while on slippery surface the control of side slip increases to achieve better stability. In addition, the slip angle gains may depend on the magnitude of side slip angle error, with the gain generally increasing as the side slip angle error increases. For example, the gain may be zero or close to zero when the magnitude of side slip angle error is below a threshold, and increases as the side slip angle error increases in magnitude.

There exist several modifications of the control law, which may be considered the special cases of the control law (64). First, the desired side slip velocity and side slip angle may be set to zero. In this case, the last two terms in equation (64) are proportional and derivative terms with respect to side slip velocity, rather than side slip errors. In this case, the desired side slip velocity does not need to be computed, which simplifies the algorithm. This simplification is justified, because at higher speeds the desired side slip angles are small, especially for active rear steer vehicles. Further simplification may be achieved by deleting the third term in the control law (64), involving the side slip velocity. In this case, the control law includes P (proportional) and D (derivative) yaw rate terms, but only a derivative lateral velocity term. In that manner, the estimation of vehicle side slip velocity is avoided and the algorithm is further simplified. The control gains may depend on whether vehicle is in oversteer or understeer condition.

As discussed earlier, differential speed signal $\Delta v_{lr3}$ determined for the brake controller can be converted into equivalent steering angle correction signal $\Delta \delta_r$ for rear axle 14 and front steering angle correction signal $\Delta \delta_f$ for axle 12. Thus the feedback portions of the front or rear steering angles can be computed from equations (65) and (66):

$$\Delta \delta_r = g_f(v_x, \mu_e)*\Delta v_{lr3} \quad (65)$$

$$\Delta \delta_f = g_r(v_x, \mu_e)*\Delta v_{lr3} \quad (66)$$

where the gains can vary with speed and the estimated surface coefficient of adhesion.

Block 42 determines a vehicle steer flag, which determines whether vehicle 10 is in understeer (flag=1) or oversteer (flag=0). The following is an example of steer flag determination.

Vehicle 10 is in understeer if either front steering angle signal $\delta_f$, control signal $\Delta v_{lr3}$ and lateral acceleration signal $a_y$ are all in the same direction or when vehicle 10 is plowing on a slippery surface. Vehicle 10 is in oversteer if either front steering angle signal $\delta_f$ is in different direction from control signal $\Delta V_{lr3}$; or front steering angle signal $\delta_f$ and control signal $\Delta v_{lr3}$ are in the same direction, but lateral acceleration signal $a_y$ is in opposite direction. If neither oversteer nor understeer conditions are satisfied, previous steer definition is held. It is theoretically possible that vehicle 10 is plowing (understeer) and front steering angle signal $\delta_f$ and control signal $\Delta v_{lr3}$ have opposite signs (oversteer). In this case vehicle state is considered oversteer (i.e. oversteer overrides understeer if both are true).

The situation when vehicle 10 is plowing is identified when the magnitude of the desired yaw rate $\Omega_d$ is significantly larger than the magnitude of measured yaw rate $\Omega$ over a pre-defined period of time, and the measured yaw rate $\Omega$ is small. This can happen only on very slippery road surface. In this situation, we do not demand that front steering angle signal $\delta_f$, control signal $\Delta v_{lr3}$ and lateral acceleration signal $a_y$ have the same signs, in order to declare understeer, since lateral acceleration signal $a_y$ may be very small in magnitude.

The over/understeer flag is used to further influence the control actions. If the brake control system is a four channel system, i.e. it can actively apply brakes to either front tires 12 and 13 (FIGS. 1A–1D) or rear tires 15 and 16 (FIGS. 1A–1D), then the control command $\Delta v_{lr3}$ is applied to tire 12 and/or tire 13 when vehicle 10 is in oversteer and to tire 15 and/or tire 16 when vehicle 10 is in understeer. For a two channel system, the control command $\Delta v_{lr3}$ is always applied to tire 12 and/or tire 13. The actual commanded differential speed signal $\Delta v_{lr3}$ is corrected for the difference in tire velocities, resulting from kinematics of turn. During cornering maneuvers, free rolling tires have a speed difference equal to the product of vehicle yaw rate $\Omega$, and the track width $t_w$. Thus, the target tire slip difference can be computed from equation (67):

$$\Delta v_{lr3t} = \Delta v_{lr3} + t_w * \Omega \quad (67)$$

When the driver is not braking, the velocity difference between front tires 12 and 13 is achieved by braking of one or both front tires 12 and 13, and the velocity difference between rear tires 15 and 16 is achieved by braking of one or both front tires 15 and 16. When driver is braking, the braking force may also be reduced on the opposite side, if braking of the desired tire reached a saturation point without achieving the desired speed difference.

A block 43 tests entry and exits conditions for applying the brake command $\Delta v_{lr3t}$ to vehicle 10. The brake command $\Delta v_{lr3t}$ is applied only if entry conditions for the active brake control are established and only until the exit conditions for active brake control satisfied. First, the estimated vehicle speed signal $v_x$ must be above a certain entry speed $v_{min}$, which is rather low, for example 5 mph. If this condition is satisfied, then the brake system becomes active when the magnitude of yaw rate error exceeds a threshold value, which depends on vehicle speed signal $v_x$, front steering angle signal $\delta_f$ and over or understeer flag. The yaw rate error consists of a proportional and a derivative terms. Thus the entry condition can be computed from the following equation (68):

$$|\Omega_d - \Omega + k_e * d(\Omega_d - \Omega)/dt| > \Omega_{thresh}(v_x, \delta_f, \text{steer\_flag}) \qquad (68)$$

where $k_e$ is a constant and $\Omega_{thresh}(v_x, \delta_f, \text{steer\_flag})$ is a threshold, which depends on the vehicle speed signal $v_x$, front steering angle signal $\delta_f$ and steer flag. It is larger in understeer condition than in oversteer. The entry conditions for the brake system are significantly relaxed, or even the system may not be allow to enter, when vehicle 10 is being braked in ABS mode. In this case, the directional control is provided by steering only, until the errors in yaw following are quite large. In the case of braking on split mu surface (a surface with significantly different coefficients of adhesion under left and right tires) the entire correction of the yaw motion is provided by steering alone. This is done in order to avoid compromising the stopping distance.

An exit condition is established if the magnitude of the yaw rate error, as defined above, is below a predetermined yaw rate error threshold (which is lower than the entry threshold) for a specified period of time or when vehicle speed drops below a certain value.

When entry conditions are not met, the active brake control system is disabled. During this time vehicle dynamic behavior is controlled through active steer control, front or rear, which do not have entry conditions. A block 44 determines total commanded targeted control valves. First, rear steering angle δrtd is computed as the sum of the feedforward part $\delta_{rff}$ and the feedback part $\Delta\delta_r$ in accordance with the following equation (69):

$$\delta_{rtd} = \delta_{rff} + \Delta\delta_r \qquad (69)$$

Figure 8:
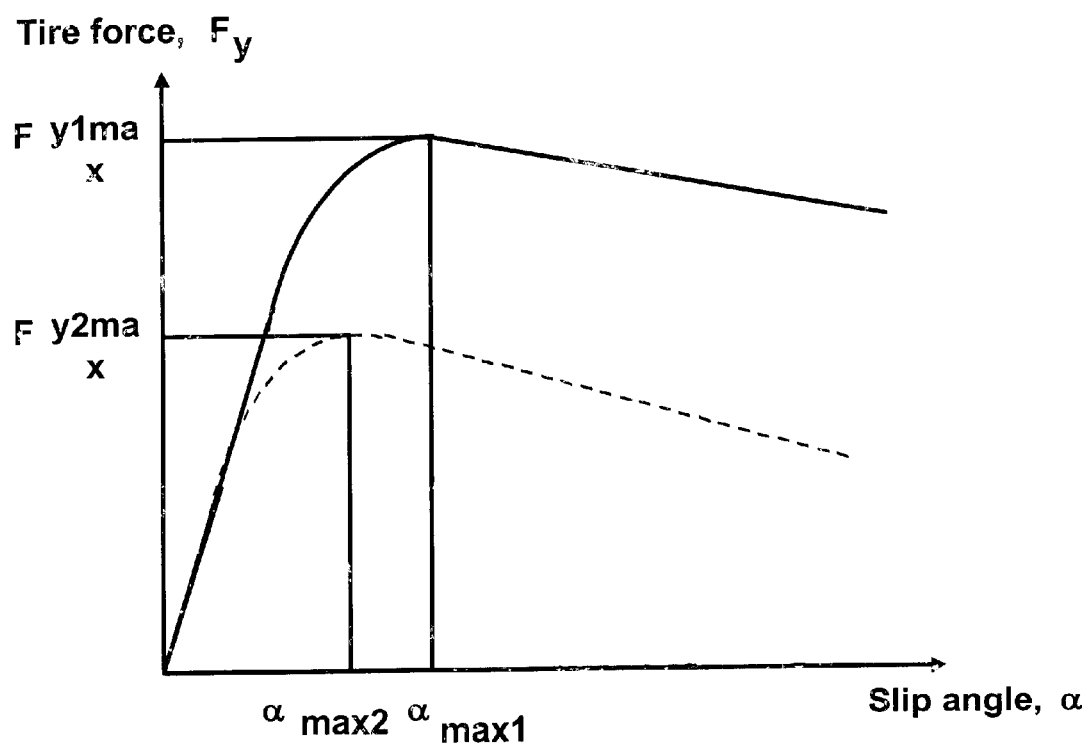
FIG. 8 is a graph of a lateral tire force vs. a tire slip angle in accordance with the present invention.

If vehicle 10 is in oversteer, the commanded rear steer angle is limited in order to limit the side slip angle of the rear tires to a maximum value $\alpha_{rmax}(\mu_e)$, which depends on the estimated surface coefficient of adhesion (it decreases when the surface estimate decreases). Typical shapes of the curves relating lateral force to the tire slip angle for two different surfaces are shown in FIG. 8. Increasing slip angle beyond $\alpha_{rmax}$ leads to decline in the magnitude of lateral force on most surfaces. The purpose is to avoid increasing slip angle beyond that corresponding to the peak lateral force. This yields the following equation (70):

$$\delta_{rtdl} = \begin{cases} (v_{ye} - b*\Omega)/v_x - \alpha_{rmax} & \text{if } \delta_{rtd} < (v_{ye} - b*\Omega)/v_x - \alpha_{rmax} \\ (v_{ye} - b*\Omega)/v_x + \alpha_{rmax} & \text{if } \delta_{rtd} > (v_{ye} - b*\Omega)/v_x + \alpha_{rmax} \\ \delta_{rtd} & \text{otherwise} \end{cases} \qquad (70)$$

Similarly, the commanded front steer angle correction, $\Delta\delta_{ftd}$ consists of the feedforward part $\delta_{fff}$ and the feedback part $\Delta\delta_f$ in accordance with following equation (71):

$$\Delta\delta_{ftd} = \delta_{fff} + \Delta\delta_f \qquad (71)$$

The total desired steering angle $\delta_{ftd}$ is the sum of the steering angle correction and the angle commanded by the driver $\delta_{fdr}$ as computed from the following equation (72):

$$\delta_{ftd} = \delta_{fdr} + \Delta\delta_{ftd} \qquad (72)$$

This steering may subsequently be a subject of the following limitation. If vehicle is in an understeer condition, then the total front tire steering angle $\delta_{ftd}$ is limited to by the following equation (73):

$$\delta_{ftdl} = \begin{cases} (v_{ye} + a*\Omega)/v_x - \alpha_{fmax} & \text{if } \delta_{ftd} < (v_{ye} + a*\Omega)/v_x - \alpha_{fmax} \\ (v_{ye} + a*\Omega)/v_x + \alpha_{fmax} & \text{if } \delta_{ftd} > (v_{ye} + a*\Omega)/v_x - \alpha_{fmax} \\ \delta_{ftd} & \text{otherwise} \end{cases} \qquad (73)$$

where $\alpha_{fmax}(\mu_e)$ is a front tires slip angle corresponding to maximum lateral force. It is a function of the estimated surface coefficient of adhesion $\mu_e$.

Thus, during normal vehicle operation, vehicle 10 is controlled through steering inputs only, which are quite effective in controlling vehicle yaw motion in and close to the linear range of handling behavior. Only if the actual response of vehicle 10 significantly deviates from the desired response, the active brake control is activated in addition to the steering control.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An integrated active steering and braking control method for a vehicle, the vehicle including an axle, a first tire, a second tire, a steering system, and a braking system, said method comprising:

determining a first corrective yaw moment as a function of a steering angle of the axle;

determining a second corrective yaw moment as a function of a speed differential between the first tire and the second tire, wherein the determination of the first corrective yaw moment and the determination of the second corrective yaw moment yields an equivalency between the first corrective yaw moment and the second corrective yaw moment;

providing a corrective steering signal to the steering system whereby said first corrective yaw moment is applied to the vehicle; and providing a corrective braking signal to the braking system whereby said second corrective yaw moment is applied to the vehicle.

2. The method of claim 1, wherein said corrective steering signal and said corrective braking signal are concurrently provided whereby said first corrective yaw moment and said second corrective yaw moment are concurrently applied to the vehicle.

3. An integrated active steering and braking control method for a vehicle, the vehicle including an axle, a first tire, and a second tire, said method comprising:

determining a desired speed differential between the speed of the first tire and the speed of the second tire as commanded by an operator of the vehicle; and determining a desired steering angle of the axle as commanded by the operator of the vehicle, the desired steering angle being a function of said desired speed differential.

4. The method of claim 3, further comprising:

determining a corrective braking signal as a function of said desired speed differential.

5. The method of claim 3, further comprising:

determining a corrective steering signal as a function of said desired steering angle.

6. The method of claim 3, further comprising:

applying a limitation to said desired steering angle; and determining a corrective steering signal as a function of said desired steering angle in view of said limitation.

7. The method of claim 3, further comprising:

selectively determining a corrective braking signal as a function of said desired speed differential; and determining a corrective steering signal as a function of said desired steering angle.

8. An integrated active steering and braking control method for a vehicle, the vehicle including an axle, a first tire, and a second tire, said method comprising:

receiving a plurality of operational signals indicative of an operational state of the vehicle;

determining a feedforward portion of a corrective front steering angle signal in response to said plurality of operational signals;

determining a feedforward portion of a corrective rear steering angle signal in response to said plurality of operational signals;

determining a feedback portion of said corrective front steering angle signal in response to said plurality of operational signals; and determining a feedback portion of said corrective rear steering angle signal in response to said plurality of operational signals.

9. The method of claim 8, further comprising:

determining a desired yaw rate in response to said plurality of operational signals;

determining a desired side slip velocity in response to said plurality of operational signals; and determining a desired side slip angle in response to said plurality of operational signals.

10. The method of claim 8, further comprising:

estimating a surface coefficient of adhesion in response to said plurality of operational signals estimating a side slip velocity in response to said plurality of operational signals; and estimating a side slip angle in response to said plurality of operational signals.

11. An integrated active steering and braking control method for a vehicle including an axle, a first tire, a second tire, a steering system, and a braking system, said method comprising:

a first controller operable to determine a first corrective yaw moment as a function of a steering angle of the axle and to determine a second corrective yaw moment for the vehicle as a function of a speed differential between the first tire and the second tire, wherein the determination of the first corrective yaw moment and the determination of the second corrective yaw moment yields an equivalency between the first corrective yaw moment and the second corrective yaw moment; and a second controller operable to provide a corrective steering signal to the steering system whereby said first corrective yaw moment is applied to the vehicle, and to provide a corrective braking signal to the braking system whereby said second corrective yaw moment is applied to the vehicle.

12. The system of claim 11, wherein said second controller is operable to concurrently provide said corrective steering signal to the steering system and said corrective braking signal to the braking system whereby said first corrective yaw moment and said second corrective yaw moment are concurrently applied to the vehicle.

13. A vehicle, comprising:

an axle;

a first tire;

a second tire; and an integrated active steering and braking control system operable to determine a desired speed differential between a speed of said first tire a speed of said second tire as commanded by an operator of the vehicle, and to determine a desired steering angle of said axle as commanded by all operator of the vehicle, the desired steering angle being a function of said desired speed differential.

14. The vehicle of claim 13, wherein said system is further operable to determine a corrective braking signal as a function of said desired speed differential.

15. The vehicle of claim 13, wherein said system is further operable to determine a corrective steering signal as a function of said desired steering angle.

16. The vehicle of claim 13, wherein said system is further operable to apply a limitation to said desired steering angle and to determine a corrective steering signal as a function of said desired steering angle in view of said limitation.

17. The vehicle of claim 13, wherein said system is further operable to selectively determine a corrective braking signal as a function of said desired speed differential and to determine a corrective steering signal as a function of said desired steering angle.

18. An integrated active steering and braking control system for a vehicle, comprising:

a means for determining a feedforward portion of a corrective front steering angle signal in response to a plurality of operational signals indicative of an operational state of the vehicle;

a means for determining a feedforward portion of a corrective rear steering angle signal in response to said plurality of operational signals;

a means for determining a feedback portion of the corrective front steering angle signal in response to a plurality of operational signals indicative of an operational state of the vehicle; and a means for determining a feedback portion of the corrective rear steering angle signal in response to said plurality of operational signals.

19. The system of claim 18, further comprising:

a means for determining a desired yaw rate in response to said plurality of operational signals;

a means for determining a desired side slip velocity in response to said plurality of operational signals; and a means for determining a desired side slip angle in response to said plurality of operational signals.

20. The system of claim 18, further comprising:

a means for estimating a surface coefficient of adhesion in response to said plurality of operational signals a means for estimating a side slip velocity in response to said plurality of operational signals; and a means for estimating a side slip angle in response to said plurality of operational signals.

* * * * *